United States Patent [19]

Harrison

[11] Patent Number: 4,807,903
[45] Date of Patent: Feb. 28, 1989

[54] AUTO CHASSIS WEIGHT EQUALIZATION SYSTEM

[76] Inventor: David Harrison, 37 Deacon Dr., Mercerville, N.J. 08619

[21] Appl. No.: 105,883

[22] Filed: Oct. 7, 1987

[51] Int. Cl.⁴ .............................................. B62D 9/02
[52] U.S. Cl. ............................... 280/772; 280/DIG. 1
[58] Field of Search ........................... 280/772, DIG. 1

[56] References Cited

U.S. PATENT DOCUMENTS 2,261,821  11/1941  Altemus ............................... 280/772
2,782,049  2/1957  Peras ............................. 280/DIG. 1
2,998,970  9/1961  Davis ............................ 280/DIG. 1

Primary Examiner—Kenneth R. Rice
Attorney, Agent, or Firm—Joel F. Spivak

[57] ABSTRACT

A system for compensating for changes in lateral forces exerted on a car's wheels during a turn comprises a device for sensing a change in the lateral forces. A second device is coupled to both a sensing device and the car's chassis which second device is responsive to the sensing device and acts to shift the relative crossweight of the vehicle to tend to equalize the forces over the wheel.

4 Claims, 3 Drawing Sheets

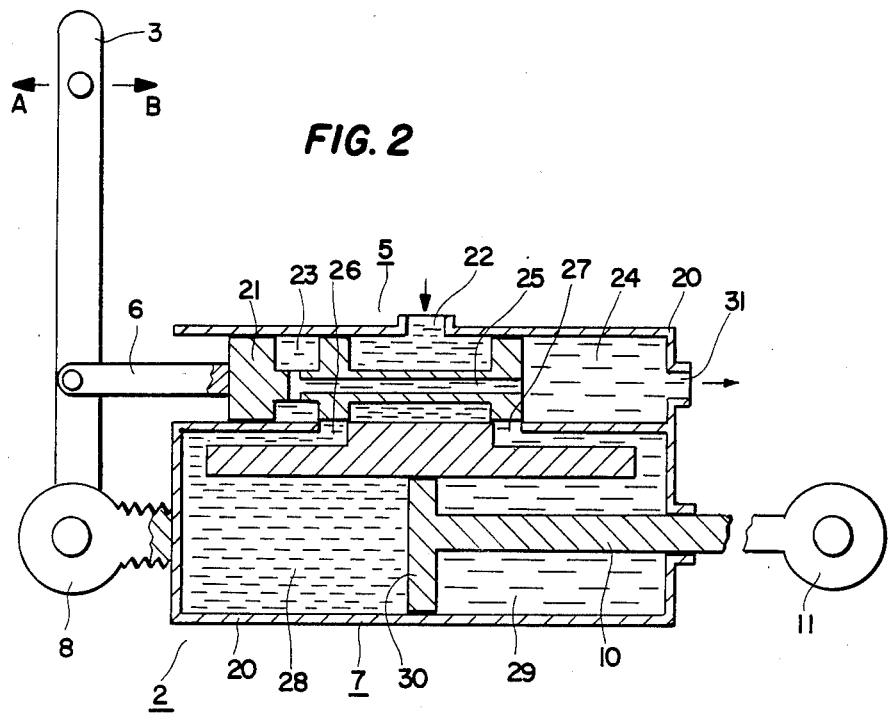

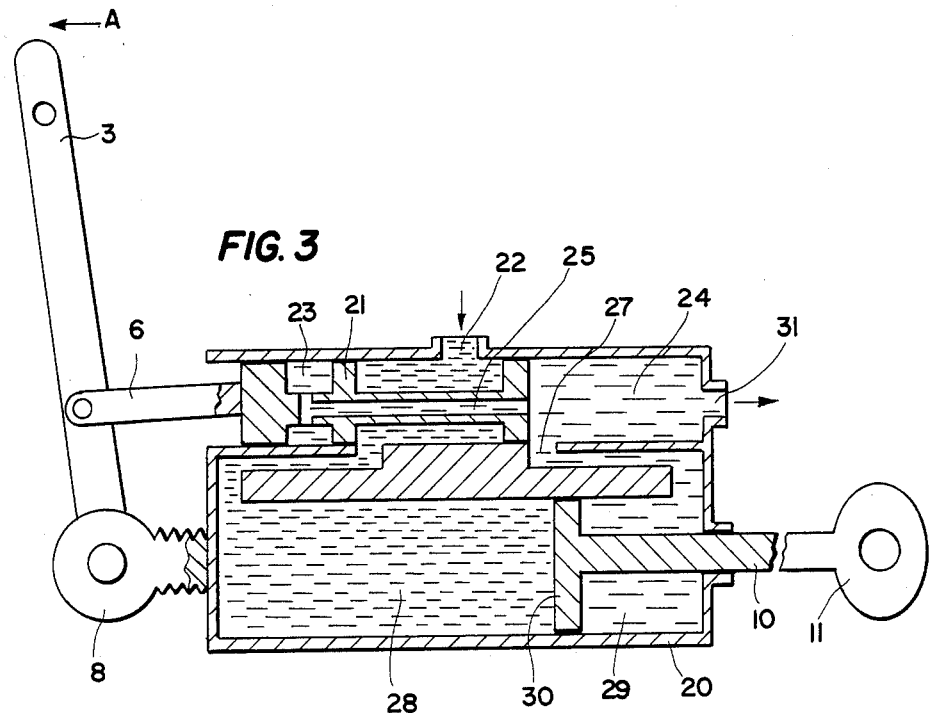
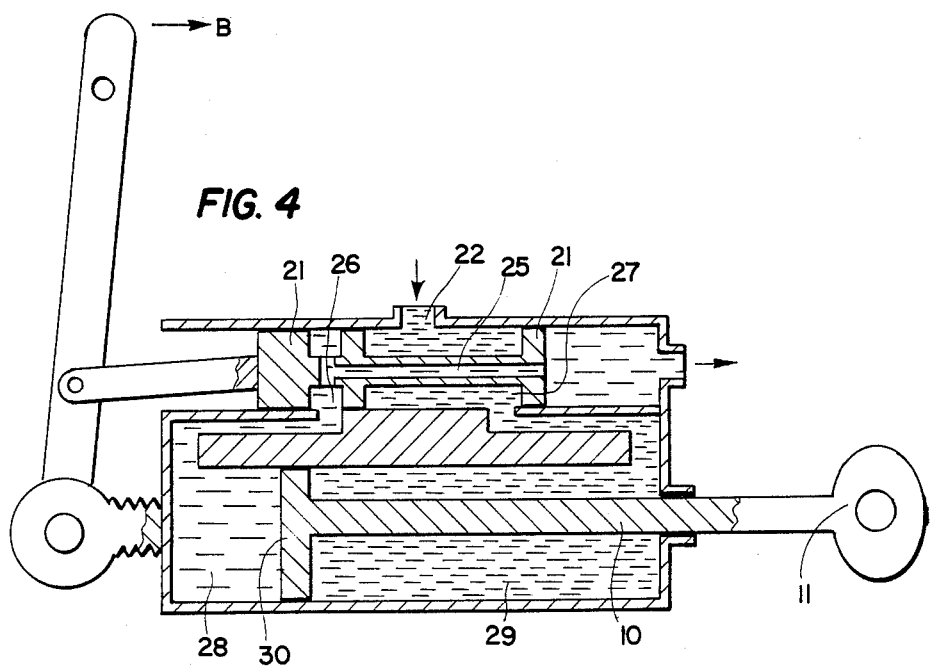

AUTO CHASSIS WEIGHT EQUALIZATION SYSTEM

FIELD OF THE INVENTION

This invention relates to a system for compensating for changes or shifting of lateral forces exerted on the tires of an autombile during a turn, especially at high speeds.

BACKGROUND OF THE INVENTION

An important factor in the design of any automobile, particularly with respect to high speed race cars, is the car's suspension system. One problem addressed by auto manufacturers, especially race car builders, is the natural tendency of the car to shift its weight due to lateral forces exerted during a turn causing the effects of oversteer or understeer.

Various means have been employed in the past to equalize these forces as between the wheels of the car. Examples of such equalization techniques often used in race cars are adjustments of the suspension known as wedge (varying weight distribution) and stagger (varying tire circumference). However, such mechanical adjustments are set in the car prior to operation of the vehicle and do not change under changing conditions. Hence, the adjustment obtained can only be optimized for a turn of a given radius and/or speed and cannot self-adjust for other conditions. A detailed explanation of chassis set-up principles can be found in Chapter 3 of Stockcar Chassis Technology, Steve Smith Auto Sports Publications.

It would therefore be extremely desirable to have a system which would automatically tend to equalize these forces thereby improving the steering and cornering of the vehicle over the varying conditions normally encountered, e.g., on grand prix, formula or SCCA type race courses.

SUMMARY OF THE INVENTION

A system for automatically improving the steering and cornering of a car in a turn comprises means coupled to the chassis of the car for varying the cross weight exerted on the wheels of the car automatically in response to an input signal from input signal means such as one derived from turning of the sterring wheel, a G-Meter or load sensor so as to tend to equalize the lateral forces as between the different wheels of the car.

BRIEF DESCRIPTION OF THE DRAWINGS

FIG. 2–4 are schematic cross sections of a hydraulic activator means which can be employed in accordance with the present invention shown in different positions.

DETAILED DESCRIPTION OF THE INVENTION

Figure 1:
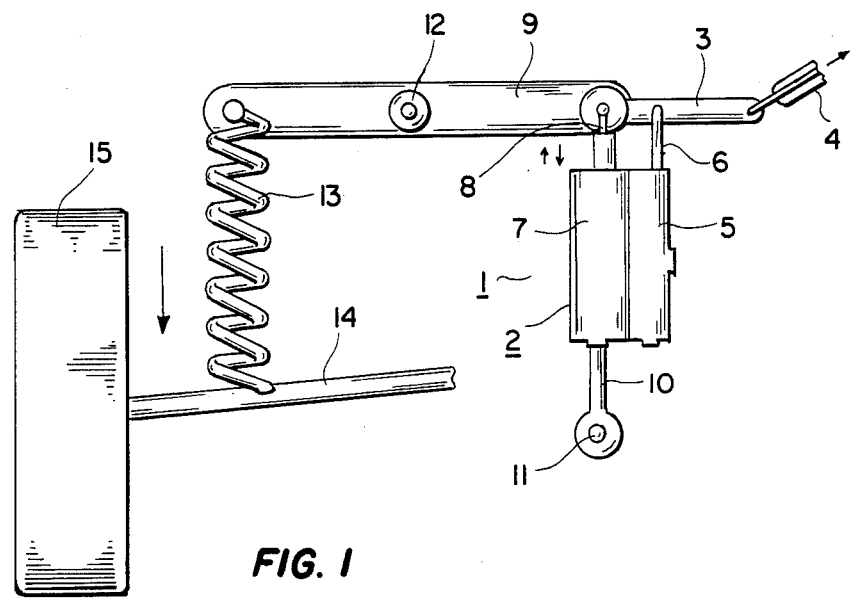
FIG. 1 is a schematic diagram showing the operation of an embodiment of the novel system including an hydraulic activator coupled to the chasis and wheel of a vehicle.

Automatic equalization of the forces exerted on the different wheels of a car during a turn is accomplished by employing input means such as one derived from the movement of the cars steering linkage, a G-meter or load sensors which are sensitive to the shifting of weight, as the steering wheel is turned, as an input means which moves an actuator an amount which is related to the degree of turn applied to the steering wheel or to the differential G-forces or load distribution. The actuator is coupled to means for raising and/or lowering one or more corners of the car in response to the direction and degree of turn (or G-forces or load) to shift the relative cross weight and tend to equalize the lateral forces encountered by the tires in a turn. This equalizes the traction of the tires on the road surface by affecting the relative downward forces exerted on the tires.

FIG. 1 shows an embodiment of the system coupled to the car's chassis, steering linkage and wheels to affect the desired results. Referring to FIG. 1, there is shown an actuator assembly (1) comprising an actuator (2) and an actuator lever (3) which is coupled to the steering linkage of the vehicle (not shown) by means of a steering linkage coupler (4) near one end of the lever (3). The central portion of the actuator lever (3) is coupled to a control valve section (5) of the actuator (2) by means of a control valve linkage rod (6). The end of the lever (3) opposite the steering linkage coupler (4) is coupled to a piston section (7) of the actuator (2) by means of a IIeim bearing (8) and is also coupled to one end of a spring control lever (9). The piston section (7) contains an internal piston having a piston shaft (10) which extends from the body of the piston section (7) opposite the IIeim bearing (8). The distal end (11) of the piston shaft (10) is affixed by means of a bearing to the chassis of the vehicle. Similarly, the central portion of the spring control lever (9) is also affixed to the chassis by means of a bearing (12). This point of attachment acts as a fulcrum about which the spring control lever (9) is raised or lowered. The end of the spring control lever (9) opposite the IIeim bearing (8) is coupled to one end of a coil spring (13). The other end of the coil spring (13) is attached to an axle or a control arm (14) which emanates from or is coupled to a wheel (15) of the vehicle.

In operation, turning of the steering wheel by the driver causes a movement of the steering linkage which, in turn, causes movement of the actuator lever. Movement of the actuator lever causes a change in the position of a control valve which controls the relative hydraulic pressure applied to the piston thereby causing movement of the assembly along the piston shaft in one or two directions depending upon the direction of turn. This movement causes the spring lever to rotate around the fixed fulcrum thereby raising or lowering the chassis. As the spring is forced down the chassis is forced upward and an additional downward force is exerted on the tire coupled to the spring adding to the traction of that tire. The movement of the chassis at one corner also affects the cross weight exerted on the other tires so as to tend to equalize the traction of all of the tires.

Referring to FIGS. 2 through 4, the hydraulic actuator assembly (1) can be seen in greater detail. In FIG. 2 the actuator is shown in a neutral position, e.g., when the car is going straight and the forces on the tires are equal. In this position there is no movement of the actuator. In FIGS. 3 and 4 the effect of moving the actuator lever in directions A and B, respectively, are shown. Referring to the Figures, the actuator (2) is seen to have the two sections, i.e., the piston section (7) and the control valve section (5) both contained with an actuator housing (20). The control valve section (5) comprises a piston-like control valve (21) which is urged forward or backward by means of the control valve linkage rod (6) which is coupled to the valve (21) and the actuator lever (3). The control valve section has a fluid input port (22) through which hydraulic fluid (or air) is pumped into the actuator (2) by means of a pump (not shown). Another portion of the control valve section which is separated from the fluid input by means of the piston-like control valve (21) has a fluid return port (31) through which fluid, under pressure, returns to the pump until such pressure is relieved. The control valve (21) is designed with an inner chamber (23) on the portion near the linkage rod (6) which communicates via a channel (25) extending through the control valve (21) with a chamber (24) of the control valve section (5) which chamber communicates with the return port (31). Depending upon the position of the control valve (21), fluid entering the control valve section (5) may flow into or out of chambers (28) or (29) of the piston section (7) of the actuator (2) through piston section fluid valve ports (26 and 27 respectively) so as to enter either the forward chamber (28) or rear chamber (29) of the piston section (7) which lie on opposite sides of the piston face (30).

In operation, as shown in FIG. 2, the control valve (21) is positioned to block the fluid valve ports (26) and (27) so that no fluid flows and the actuator remains in a neutral position. When the actuator lever (3) is caused to move in direction "A" (FIG. 3) it causes the control valve linkage rod (6) and control valve (21) to move in the same direction. This allows fluid pumped into the control valve section (5) to flow into the forward piston chamber (28) of the piston section (9) through fluid port (26) which causes pressure to be exerted on the piston face (30). This forces the actuator to move in the direction "A" due to the fact that the piston shaft is fixed to the chassis at bearing point (11). At the same time fluid from the rear piston chamber (29) exits the piston section via fluid port (27) into the control valve section (5) and then back to the pump. As the actuator moves, the actuator lever will stop moving in direction "A", since the pressure will equalize and fluid ports (26) and (27) will be closed by valve (21). At this time fluid flow stops and the actuator movement stops.

When the actuator lever is moved in direction "B" (FIG. 4) so that the input fluid pressure now allows fluid to flow into the rear piston chamber (29) via port (27). In this instance the actuator is forced rearward, ie.., in the direction "B" and hence has the opposite effect on the control system as a movement in direction (a). The fluid in forward chamber (28) is forced back to the pump by flowing through valve port (26) into the inner chamber (23) of the control valve (21) and thence through the channel (25) out of the return port (31).

The actuator may be installed in the vehicle's center line locating linkage. This will relocate the center line of the chassis between the wheels as the actuator moves to add or remove weight to one side of a car by shifting the side weight while in a turn thereby compensating for centrifugal weight transfer caused by the turn.

As previously indicated,the actuator may be controlled by various means including, but not limited to, direct coupling to the steering linkage, mechanical or electrical means responsive to G-forces as measured by one or more G-Meters coupled to the wheels or other members near the corners or center of the vehicle, preferably in a bridge sensing arrangement, so as to cause equalization of these G-forces by movement of the actuator. Similarly, one may use a load sensor at one or more corners of the car.

It will further be appreciated that the actuator shown is merely an example of one useful device for automatically adjusting the relative weight, traction and/or lateral forces so as to tend to equalize them over the various wheels to improve steering and cornering in a turn. Also, suitable actuators which have been employed for other purposes in the aircraft and boating industries are commercially available. Further, details of a suitable actuator can be found with reference to U.S. Pat. No. 4,231,284 which is incorporated herein by reference. In addition, it should be understood that the invention is not limited to the use of a hydraulic or fluid pressure type actuator. For example, one may employ a reversible electric motor as the actuator means for causing movement of the chassis in response to an input signal from a sensor. It should be noted that use of a load sensor or G-Meter as the signal input means may be superior to a simple steering wheel linkage input due to the fact that the former mentioned means can take into account the total forces created due to different speeds and banking as well as the radius of turn.

What I claim is:

1. A system for automatically improving the handling of a vehicle during a turn comprises sensing means coupled to the vehicle for sensing the degree and direction of the turn and actuator means mounted on the chassis of said vehicle and responsive to said sensing means, said actuator means comprising a hydraulic fluid actuator having a control valve section which communicates with a piston section, said piston section comprising a housing having therein a piston and piston rod extending axially therefrom to form two fluid chambers one on each side of said piston and wherein the control valve position causes fluid to enter one of said two chambers of said piston section, thereby causing movement of the actuator in one of two directions along the axis of said piston rod, and wherein the end of said piston rod is fixedly mounted to the chassis of said vehicle and further wherein movement of the actuator causes movement of a spring control means coupled to said actuator and to a coil spring, said coil spring being coupled to a wheel in a manner such that compression or stretching forces on the spring caused by movement of spring control means causes the chassis in the vicinity of the spring to raise or lower thereby redistributing the lateral forces exerted on the wheels of said vehicle in a manner as to tend to equalize said forces.

2. A system for automatically tending to equalize the lateral forces exerted on the wheels of a car during a turn or other changing road conditions comprises actuator sensor means responsive to turning of the steering wheel of said car and coupled both to said car's steering linkage and to control means which controls the movement of an actuator assembly, said actuator assembly having one point fixedly mounted to the chassis of said car and at least one part which can move forward or backward, said moveable portion of said actuator assembly being coupled to a spring control lever so as to cause said lever to move in an arcuate motion about a fixed fulcrum in the central portion of said lever which is mounted to said chassis at said fulcrum, said lever being coupled to a spring located near a corner of said car such that movement of said lever causes compression or stretching forces to be exerted on said spring, said spring being coupled to said car such that said forces on said spring causes upward or downward movement of that corner of the car thereby changing the relative cross-weight over the wheels of the car in response to turning of the car's steering wheel.

3. The system recited in claim 2 wherein said actuator assembly is mounted to said car along a center-line locating linkage.

4. The system recited in claim 2 wherein said actuator assembly comprises a hydraulic pump coupled to a hydraulic actuator including an actuator control portion and a piston portion, said control portion comprising a housing having a hydraulic fluid inlet port, a moveable control valve coupled to said sensor, a fluid return port, and two spaced fluid outlet holes which communicate with said position section whereby the position of said control valve blocks fluid flow to one or both of said spaced fluid outlet ports, said piston portion comprising a cylindrical housing having a piston therein said piston dividing said housing into two chambers each chamber communicating with one of said spaced control section fluid outlet holes such that fluid enters said piston section from one of said holes causes movement of said piston relative to said piston housing to expand said chamber and forces fluid out of the other chamber through the other fluid outlet port and fluid return port, said movement causing movement of said spring control lever.

* * * * *